Patented Feb. 7, 1950

2,496,480

UNITED STATES PATENT OFFICE 2,496,480

PREPARATION OF POLYVINYL ACETAL RESINS OF IMPROVED STABILITY

Edward Lavin and Alfred T. Marinaro, Springfield, and William R. Richard, West Springfield, Mass., assignors to Shawinigan Resins Corporation, Springfield, Mass., a corporation of Massachusetts No Drawing. Application June 12, 1946, Serial No. 676,352

6 Claims. (Cl. 260—73)

This invention relates to the preparation of polyvinyl acetal resins. More particularly, this invention relates to the preparation of polyvinyl acetal resins having improved stability.

Polyvinyl acetal resins are customarily made by hydrolyzing polyvinyl esters in the presence of sulfuric acid and reacting the hydrolysis product with an aldehyde in the presence of sulfuric acid. The resulting polyvinyl acetal resins have presented a serious heat stabilization problem and various types of treatment have been suggested for overcoming this difficulty.

Thus, it has been proposed to overcome the heat instability of such prior polyvinyl acetal resins by treatment with alkaline materials such as potassium hydroxide. Typical of such processes are those described in U. S. 2,258,410 and U. S. 2,282,057 which are effective in producing polyvinyl acetal resins sufficiently heat stable for processing purposes, paticularly when a substantial excess of alkaline material is left in the resin. Such products have proved to be adaptable for many purposes, for example, in preparing interleaf material for safety glass. However, it has been found that compositions comprising such stabilized polyvinyl acetal resins tend to have certain disadvantages. For example, interleaf compositions comprising resins having "alkaline titers" over about 25 tend to have a substantially reduced adhesion to glass, a disadvantage which is particularly accentuated when even traces of moisture are present in the plastic such as may result from exposure to humid atmospheric conditions. Also, outside exposure of laminated glass bonded with interleaf compositions comprising such resins, tends to result in separation of the plastic from the glass, particularly around the edges. This characteristic does not appear to be influenced by the original moisture content of the plastic.

It is an object of this invention to provide an improved process for preparing polyvinyl acetal resins. A further object is to provide a process for preparing polyvinyl acetal resins having improved stability. A particular object of this invention is to provide polyvinyl acetal resins requiring only small excess of alkali for stabilization.

These and other objects are attained by reacting a sulfuric acid-hydrolyzed polyvinyl ester, an hydroxyl group-containing compound and an aldehyde in the presence of a catalyst containing the $HSO_4$ group until the hydroxyl group content of the resulting polyvinyl acetal resin decreases to a substantially minimum value and thereafter maintaining the reaction mixture under reacting conditions until the non-extractable sulfur content of the polyvinyl acetal resin does not exceed about 0.025% by weight calculated as $SO_4$, the catalyst being selected from the group consisting of sulfuric acid, organic hydrogen sulfates and mixtures of sulfuric acid and organic hydrogen sulfates, and said catalyst being present in an amount such that after equilibrium conditions are reached with respect to the non-extractable sulfur content of the resulting polyvinyl acetal resin, the non-extractable sulfur content does not exceed about 0.025% by weight calculated as $SO_4$. It has been found that polyvinyl acetal resins prepared in this manner resist discoloration on heating when an amount of alkali, such as potassium hydroxide, is associated with the resin such that not over about 25 cc. of 0.01N HCl are required to neutralize a solution of 100 grams of the resin using bromphenol blue indicator.

The following examples are illustrative of the present invention, but are not to be construed as limitative thereof. Where parts are mentioned, they are parts by weight.

The polyvinyl acetate used in the examples has such a degree of polymerization that a 1-molar benzene solution thereof has a viscosity of 50 centipoises at 20° C.

EXAMPLE I

*Hydrolysis of polyvinyl acetate*

| | Parts |
|---|---|
| Ethanol (95%) | 17 |
| Solution of 28 parts of polyvinyl acetate in 44 parts of ethanol and 8 parts of water | 80 |
| Sulfuric acid (93%) | 3 |

The ethanol and sulfuric acid are mixed and charged to a reaction vessel equipped with an agitator and return condenser. The mixture is heated to about 70–75° C. and thereafter, the polyvinyl acetate solution is added and the mixture heated for about 6–7 hours at about 75° C. The reaction mixture initially comprises an ethanol solution of the several ingredients but as the reaction continues, the polyvinyl alcohol precipitates out and the product comprises a suspension of the polyvinyl alcohol in ethanol and ethyl acetate.

The solid product is separated from the suspending liquid and washed with ethanol. The polyvinyl alcohol obtained contains 4–5% combined acetate by weight, calculated as polyvinyl acetate. The product, on titration of an aqueous solution thereof with sodium hydroxide solution using brom phenol blue indicator, shows an acid content of 2.5% calculated as sulfuric acid based on polyvinyl alcohol. This acid content comprises a mixture of sulfuric acid and ethyl hydrogen sulfate. The product is also characterized by the fact that even after repeated precipitations from solution in water by addition of a non-solvent such as ethanol, the sulfur content is not entirely eliminated, but is found to drop to substantially constant value of 0.6% calculated as $SO_4$, hereinafter refered to as non-extractable sulfur.

*Acetalization of the polyvinyl alcohol*

| | Parts |
|---|---|
| Polyvinyl alcohol (dry basis) | 400 |
| Ethanol | 2210 |
| Butyraldehyde | 250 |
| Catalyst containing the —$HSO_4$ group occluded in the polyvinyl alcohol calculated as $H_2SO_4$ | 10 |

The portion of the ethanol not occluded by the polyvinyl alcohol (about 1800 parts) is preheated to 65–70° C. and then introduced into a reaction vessel equipped with a stirrer and water-cooled return condenser. The polyvinyl alcohol with the occluded ethanol and catalyst is then added, followed by the butyraldehyde. Thereafter, the mix is heated with stirring to just below the boiling point thereof and maintained at about 75–78° C. After about 3–5 minutes under these conditions, the mix forms into a soft gel. Agitation is then suspended until the gel starts to break up. This requires about 5–10 minutes. After an elapsed time of about 1–2 hours from the introduction of the butyraldehyde, it is found that the acetalization reaction has reached equilibrium, i. e., there is substantially no further drop in the percentage of free hydroxyl groups in the polyvinyl acetal resin. However, the mix is maintained under the same conditions of temperature and agitation for a further period of about 3 hours.

The resulting polyvinyl acetal resin is then precipitated by the addition of water and thoroughly washed with water until substantially all of the ethanol and free acid have been removed. After repeated precipitations from solution in ethanol by addition of a non-solvent such as water, the sulfur content of the product is found to drop to a substantially constant value that is less than 0.025% by weight calculated as $SO_4$.

The product may be stabilized by treatment with potassium hydroxide while in suspension in an aqueous solution of ethanol containing 37% ethanol. About 100 parts of resin are used for every 1000 parts of suspension medium. The suspension is maintained at about 45° C. for several hours under moderate agitation while being maintained slightly alkaline to phenolphthalein by the addition of suitable quantities of potassium hydroxide. The potassium hydroxide is added in small quantities during the first hour until about 7.0 cc. of N/50 HCl are required to neutralize a 10 cc. sample using brom phenol blue indicator. Thereafter the heating and agitation are continued without further additions of alkali for 3–4 hours.

The polyvinyl acetal resin is then separated from the suspension medium, washed with water and dried at a slightly elevated temperature, e. g. 70° C. The resin is found to contain on a weight basis, 16–20% hydroxyl groups calculated as polyvinyl alcohol, less than 3% acetate groups calculated as polyvinyl acetate and the balance substantially butyraldehyde acetal.

In this example, the amount of potassium hydroxide incorporated in the resin is such that about 20 cc. of 0.01N hydrochloric acid are required to neutralize 100 grams of resin in a 3% methanol solution using brom phenol blue indicator. Such a resin is designated as having an "alkaline titer" of 20. The product is white in color and on heating the resin for 2 hours at 160° C. only a pale yellow color is formed.

In contrast to the product in this example, if the reaction is stopped as soon as the percentage of free hydroxyl groups reaches a substantially constant minimum value and the resin then washed and treated with potassium hydroxide in the manner set forth above so as to produce a resin having an "alkaline titer" of not over about 25, such a product turns dark brown on heating for 2 hours at 160° C. and is unsuitable for many processing operations requiring elevated temperatures.

In further contrast to the product described in Example I, if the amount of acid catalyst is increased, for example to 2% based on the charge and the reaction continued until the amount of non-extractable sulfur reaches a minimum, the product, treated with potassium hydroxide so as to have an "alkaline titer" of not over about 25, turns dark brown on heating at 160° C. for 2 hours.

EXAMPLE II

Example I is repeated except that in addition to the catalyst occluded by the polyvinyl alcohol, 10 parts of sulfuric acid (98%) is included in the charge.

The product is found to have a non-extractable sulfur content, calculated as $SO_4$, of less than 0.025% by weight and on stabilization so as to have an "alkaline titer" of 20–25, has a heat stability similar to that of the product in Example I. The hydroxyl and acetate group content of the product is substantially the same as that of the product in Example I.

In contrast to the product described in this example, if the acetalization reaction is continued for the same length of time at 50° C., the product turns brown on heating for 2 hours at 160° C., when stabilized with potassium hydroxide so as to have an "alkaline titer" of not over about 25. Similar results are obtained if the reaction is stopped as soon as the percentage of free hydroxyl groups reaches a substantially constant minimum value.

EXAMPLE III

Example I is repeated except that the polyvinyl alcohol is washed with ethanol sufficiently to reduce the content of catalyst calculated as $H_2SO_4$ to about 1%. Accordingly, the content of catalyst in the charge calculated as $H_2SO_4$ amounts to 4 parts (based on 400 parts of polyvinyl alcohol).

The product is found to have a non-extractable sulfur content calculated as $SO_4$, of less than 0.01% by weight and on stabilization so as to have an "alkaline titer" of 10–15, has heat stability similar to that of the product in Example I. The hydroxyl and acetal group content of the product is substantially the same as that of the product in Example I.

A particularly valuable embodiment of the invention resides in the use of relatively high acetalization temperatures, i. e. 70–100° C. and preferably 75–80° C. Previously it has been considered that high temperatures should be avoided if a stable, light colored product is desired when sulfuric acid is used as a catalyst. Thus, it is surprising that, as shown by Example I, a more readily stabilized product is obtained after 1–2 hours reaction at 75–80° C. than after the same length of time at 50° C. when it would normally be expected that the destructive effect of sulfuric acid would be increased at high temperatures.

While the polyvinyl acetal resins made by the process of the present invention require a stabilizing treatment in order to meet the requirements of certain applications, they inherently possess a substantially improved stability. As pointed out above, additional stability may be imparted by treatment with small amounts of potassium hydroxide or hydroxides of other alkali metals such as sodium and lithium. Alkali metal salts of weak acids such as carbonic acid, formic acid, acetic acid, propionic acid, butyric acid, benzoic acid, boric acid, citric acid, fumaric acid, lactic acid, maleic acid, malic acid, malonic acid, oxalic acid, phthalic acid, succinic acid, salicylic acid, tartaric acid, valeric acid and the like, may be used. When a steeping process is used in which a weak organic acid is employed in the steeping liquid, it is generally preferred to use the corresponding alkali metal salt as the alkali stabilizer as pointed out in U. S. 2,258,410. U. S. 2,258,410 and U. S. 2,282,057 set forth typical methods of treating polyvinyl acetals with alkali metal compounds. In addition, an additional stabilizing effect may be introduced by treatment with other stabilizing agents such as various amines and phenols and derivatives thereof.

Analysis of the resin in the reaction mixture as the acetalization continues shows that the number of free hydroxyl groups reaches a substantially constant minimum value long before the amount of non-extractable sulfur reaches substantially a minimum value. Thus, in Example I it is found that after 1–2 hours the free hydroxyl group content has reached a minimum value whereas the amount of non-extractable sulfur reaches a minimum value only after 4–5 hours.

Among the numerous advantages of the process of the invention is the fact that it permits the wider use of polyvinyl alcohols made by hydrolysis of polyvinyl esters in the presence of sulfuric acid. Usually, for rapid hydrolysis, 1–5% by weight of sulfuric acid are used based on the hydrolysis charge so that the non-extractable sulfur content of the hydrolysis product is far above that permissible in a polyvinyl acetal resin having good stability and a low "alkaline titer." Thus, such polyvinyl alcohols contain more than 0.05% of non-extractable sulfur by weight calculated as $SO_4$ and usually from 0.1–1%.

Numerous variations may be introduced into the process of the invention as illustrated by the examples. In place of butyraldehyde, other carbonyl group-containing compounds may be used, as for example, formaldehyde, acetaldehyde, propionaldehyde, valeraldehyde, cyclohexanone and the like, and mixtures thereof. Furthermore, the polyvinyl acetal resin is not limited to any specific hydroxyl, ester or acetal group content.

In place of the polyvinyl alcohol used in the examples, other polyvinyl alcohols having varying residual ester contents and types of ester groups may be used. Thus, the ester content may be substantially entirely eliminated or may amount to as much as 30–40% calculated as polyvinyl ester. In place of polyvinyl acetate, other polyvinyl esters may be used in making the hydrolysis product, as for example, the corresponding formate, propionate, butyrate, etc. The polyvinyl ester may vary widely in degree of polymerization as evidenced by the viscosity of solutions thereof. For example, polyvinyl acetates may be used, 1-molar benzene solutions thereof varying in viscosity from 5 to 500 in centipoises at 20° C. Other polyvinyl esters may have corresponding degrees of polymerization.

In place of the mixture of hydroxyl group-containing compounds used in the examples, namely, ethanol and water, the acetalization reaction may be initiated in the presence of other mixtures of low molecular weight hydroxyl group-containing compounds or in the presence of a single compound of this type. However, since water is formed as a result of the acetalization reaction, this compound is necessarily present once the reaction has started. In place of ethanol, other organic hydroxyl group-containing compounds may be used, as for example, such alcohols as methanol, propanol, butanol, hexanol, octanol. The particular alcohol selected depends on the nature of the polyvinyl acetal resin being prepared and the results desired. For example, when it is desired that a solution of the polyvinyl acetal resin result, the alcohol selected may be a solvent for the product. Thus, even higher members of the alkanol series, as for example, alkanols having up to about 18 carbonatoms, e. g. octadecanol, may be useful in some instances, e. g., in making acetals from long chain aldehydes. Other alcohols which may be used include glycols, such as ethylene glycol, propylene glycol, diethylene glycol, tetraethylene glycol and the like, glycerine, erythritol, pentaerythritol, sorbitol, mannitol, aromatic alcohols such as benzyl alcohol, etc. In preparing polyvinyl butyraldehyde acetal resins in solution, the use of alkanols having substantial compatibility with water are preferred, such as methanol, ethanol, propanols and butanols.

The proportion of butyraldehyde or other aldehyde may be substantially varied. However, as is well known to those skilled in the art, the amount and nature of the various ingredients in the acetalization charge will affect the degree of acetalization that results so that such variables are controlled to achieve the particular result desired.

In place of ethyl hydrogen sulfate present in the acid catalysts of the examples, other organic hydrogen sulfates made by reacting sulfuric acid with alcohols of the types mentioned above may be used. The organic hydrogen sulfates may be added as such to the acetalization charge in addition to any sulfates which may be formed in situ as a result of reaction between sulfuric acid and an alkanol, e. g., during the hydrolysis of the polyvinyl ester. Usually, if additional acid is desired, sulfuric acid is used so that any organic hydrogen sulfates present at the start of the acetalization correspond to the alcohols present during the hydrolysis. Additional organic hydrogen sulfates may be formed during the acetalization by reaction between the sulfuric acids and added alcohols.

The maximum amount of sulfuric acid, organic hydrogen sulfates or mixtures thereof which may be present in the charge and still yield a product with not over 0.025% sulfur by weight calculated as $SO_4$ varies to some extent with the nature and amounts of the ingredients in the charge. However, in making polyvinyl butyraldehyde acetals in the presence of 250 to 1000 parts or more of an alkanol containing 1-8 carbon atoms for each 100 parts of hydrolyzed polyvinyl acetate, the amount of such acids is such that not over about 1.3% and, preferably, not over 1% $SO_4$ groups calculated as $H_2SO_4$ are present based on the total charge.

The temperature at which the acetalization reaction is carried out may be substantially varied. However, temperatures of at least about 40° C. are usually employed. When the temperature employed is above the boiling point of the solvent used, it is necessary, of course, to use a closed system. Otherwise, a reaction vessel equipped with a water-cooled return condenser is usually adequate. As pointed out above, a particularly valuable embodiment of the invention resides in the use of relatively high acetalization temperatures, i. e., 70-100° C. and preferably, 75-80° C.

The foregoing description is given in illustration and not in limitation of the invention as set forth in the appended claims.

What is claimed is:

1. A process for preparing a polyvinyl butyraldehyde acetal resin having improved stability, which comprises heating at 40-100° C. a mixture of a sulfuric acid-hydrolyzed polyvinyl acetate, butyraldehyde and ethanol in the presence of sulfuric acid until the hydroxyl group content of the resulting polyvinyl acetal resin decreases to a substantially constant value and thereafter maintaining the reaction mixture under reacting conditions until the non-extractable sulfur content of the polyvinal acetal resin decreases to a substantially constant value, not over 1.3% $SO_4$ groups calculated as $H_2SO_4$ being present based on the total charge and the ethanol being present in the amount of 250-1000 parts for every 100 parts of the hydrolyzed polyvinyl acetate.

2. A process as defined in claim 1 which includes the additional step of treating the resulting polyvinyl acetal resin with a sufficient amount of a substance selected from the group consisting of alkali metal hydroxides and basic-reacting salts thereof made with weak acids so that a solution of the polyvinyl acetal so treated is alkaline to brom-phenol blue, but does not require more than 25 cc. of 0.01N HCl for neutralization of each 100 grams of resin.

3. A process for preparing a polyvinyl butyraldehyde acetal resin having improved stability, which comprises heating at 40-100° C. a mixture of a sulfuric acid-hydrolyzed polyvinyl ester of a carboxylic acid, butyraldehyde and an alkanol containing 1-8 carbon atoms in the presence of sulfuric acid until the hydoxyl group content of the resulting polyvinyl acetal resin decreases to a substantially constant value and thereafter maintaining the reaction mixture under reacting conditions until the non-extractable sulfur content of the polyvinyl acetal resin does not exceed 0.025% by weight, calculated as $SO_4$, not over 1.3% $SO_4$ groups, calculated as $H_2SO_4$, being present based on the total charge and the alkanol being present in the amount of 250-1000 parts for every 100 parts of the hydrolyzed polyvinyl ester.

4. A process as defined in claim 3 which includes the additional step of treating the resulting polyvinyl acetal resin with a sufficient amount of a substance selected from the group consisting of alkali metal hydroxides and basic-reacting salts thereof made with weak acids so that a solution of the polyvinyl acetal so treated is alkaline to brom-phenol blue, but does not require more than 25 cc. of 0.01N HCl for neutralization of each 100 grams of resin.

5. A process for preparing a polyvinyl butyraldehyde acetal resin having improved stability, which comprises heating at 40-100° C. a mixture of a sulfuric acid-hydrolyzed polyvinyl ester of a carboxylic acid, butyraldehyde and an alkanol containing 1-8 carbon atoms in the presence of sulfuric acid until the hydroxyl group content of the resulting polyvinyl acetal resin decreases to a substantially constant value and thereafter maintaining the reaction mixture under reacting conditions until the non-extractable sulfur content of the polyvinyl acetal resin decreases to a substantially constant value, not over 1.3% $SO_4$ groups calculated as $H_2SO_4$ being present based on the total charge and the alkanol being present in the amount of 250-1000 parts for every 100 parts of the hydrolyzed polyvinyl ester.

6. A process for preparing a polyvinyl butyraldehyde acetal resin having improved stability, which comprises heating at 40-100° C. a mixture of a sulfuric acid-hydrolyzed polyvinyl ester of a carboxylic acid, butyraldehyde and ethanol in the presence of sulfuric acid until the hydroxyl group content of the resulting polyvinyl acetal resin decreases to a substantially constant value and thereafter maintaining the reaction mixture under reacting conditions until the non-extractable sulfur content of the polyvinyl acetal resin does not exceed 0.025% by weight calculated as $SO_4$, not over 1.3% $SO_4$ groups calculated as $H_2SO_4$ being present based on the total charge and the ethanol being present in the amount of 250-1000 parts for every 100 parts of the hydrolyzed polyvinyl ester.

EDWARD LAVIN.
ALFRED T. MARINARO.
WILLIAM R. RICHARD.

REFERENCES CITED

The following references are of record in the file of this patent:

UNITED STATES PATENTS

| Number | Name | Date |
|---|---|---|
| 2,179,051 | Morrison et al. | Nov. 7, 1939 |
| 2,360,477 | Dahle | Oct. 17, 1944 |
| 2,400,957 | Stamatoff | May 28, 1946 |